3,137,699
1-IMINO-3-OXO-4,7-DIAMINO-5,6-PHTHALOYL-DIHYDRO-ISOINDOLE DYESTUFFS

Ernst Hartwig and Willy Braun, Heidelberg, Germany, assignors to Badische Anilin- & Soda-Fabrik Aktiengesellschaft, Ludwigshafen (Rhine), Germany
No Drawing. Filed Sept. 7, 1961, Ser. No. 136,435
Claims priority, application Germany Sept. 8, 1960
7 Claims. (Cl. 260—272)

This invention relates to new dyes of the anthraquinone series which are derived from 1-amino-3-oxo-4,7-diamino-5,6-phthaloyl-dihydro-isoindole by substitution in 2-position, and to a process for the production of dyes of the said series. More specifically, it relates to the production of dyes of the 1-imino-3-oxo-4,7-diamino-5,6-phthaloyl-dihydro-isoindole series.

Dyes are known from the literature which are obtained by reaction of 1-imino-3-oxo-4,7-diamino-5,6-phthaloyl-dihydro-isoindole with aliphatic amines, the 1-imino group being substituted. These dyes give blue dyeing on polyester fibers but have unsatisfactory affinity. 1,3-diketo-4,7-diamino - 5,6 - phthaloyl-dihydro-isoindoles substituted in 2-position, which are also known, similarly have unsatisfactory affinity for polyester fibers. Moreover, the said known dyes are difficult to prepare.

It is an object of the present invention to provide dyes which give clear blue dyeings, especially on polyester fibers, but also on other synthetic fibers, and which are distinguished by good affinity. Another object of the invention is a simple process for the production of such dyes. These objects are achieved by the dyes according to this invention and the process for their production according to this invention.

Another object of this invention is to provide new 1-imino-3-oxo-4,7-diamino-5,6 - phthaloyl-dihydro-isoindoles substituted in 2-position by an aliphatic group.

A further object of the invention is a very simple process for the production of these dyes by reaction of 1-amino-4-nitroanthraquinone-2 - carboxylic acid amides with cyanide.

A still further object of this invention is a simple process for the production of 1-imino-3-oxo-4,7-diamino-5,6-phthaloyl-dihydro-isoindole and for its hydrolysis to 1,3-dioxo-4,7-diamino-5,6-phthaloyl-dihydro-isoindoles.

The new blue dyes are distinguished by their excellent affinity for polyester fibers. Dyeings prepared therewith have excellent all-round fastness properties, especially fastness to light and washing.

The invention relates especially to dyes of the general formula:

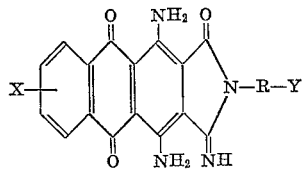

(I)

in which X denotes a hydrogen atom, a chlorine atom or a bromine atom, R denotes an aliphatic radical with 1 to 10 carbon atoms and Y denotes a hydrogen atom, a hydroxy, methoxy, ethoxy, hydroxyethoxy, cyano pyrrolidino, pyrrolidono, piperidino or methylcyclohexylamino group.

The invention further relates to a process for the production of dyes of the general formula:

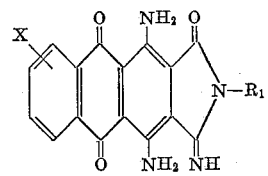

(II)

in which X denotes a hydrogen, chlorine or bromine atom and $R_1$ denotes a hydrogen atom or an aliphatic radical with 1 to 10 carbon atoms, by heating a compound of the formula:

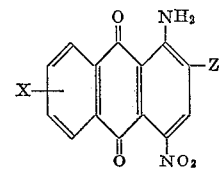

(IIIa)

in which X has the above meaning and Z denotes a hydrogen atom, a carboxy group, a carboxylic acid amide group —$CONHR_1$ in which $R_1$ has the above meaning, a carboxylic acid ester group of a low molecular weight alcohol, a carboxylic acid halide group, especially a carboxylic acid chloride group, or a sulfonic acid group, with a water-soluble ionic cyanide, such as sodium cyanide, potassium cyanide, magnesium cyanide, or calcium cyanide, in a diluent at 20° to 180° C., preferably 60° to 120° C.

The invention further relates to a process for the production of dyes of the formula:

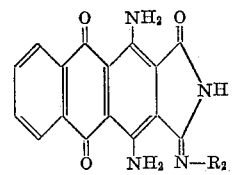

(IV)

in which $R_2$ denotes an aliphatic radical with 1 to 10 carbon atoms by simultaneously heating a compound of the formula:

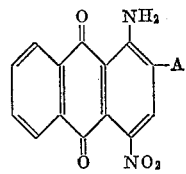

(IIIb)

in which A denotes a carboxylic acid radical or a sulfonic acid radical, with a water-soluble ionic cyanide, such as sodium cyanide, potassium cyanide, calcium cyanide or magnesium cyanide, and an amine of the formula $R_2$—$NH_2$, in which $R_2$ has the above meaning, in a diluent at 20° to 180° C., preferably 60° to 120° C.

The invention moreover relates to a process for the production of compounds of the formula:

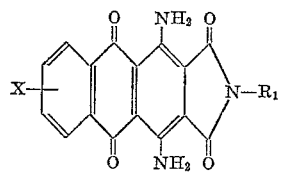

(V)

in which X and $R_1$ have the above meanings, by hydrolysis of compounds of the Formula II with strong mineral acids, such as 96% sulfuric acid or concentrated phosphoric acid, at 20° to 130° C. If the hydrolysis of compounds of the Formula II (in which $R_1$ denotes an aliphatic radical) is carried out at 40° to 90° C., preferably at 80° to 90° C., compounds of the Formula V are obtained in which the aliphatic radical is unchanged. If heating is to higher temperatures, for example to 120° to 130° C., the aliphatic radical is also split off and a compound of the Formula V is obtained in which $R_1$ denotes H.

The reaction of the cyanides with compounds of the Formulae IIIa and IIIb is carried out in polar solvents which are liquid at the reaction temperature, undergo no change during the reaction and in which the cyanides have at least slight solubility, preferably in liquids containing OH groups such as water or water-soluble organic solvents, especially low molecular weight alcohols, which may be diluted with water to a greater or lesser extent, ethers which are miscible with water, such as glycol monomethyl ether, dioxane, tetrahydrofurane, low molecular weight acid amides, such as dimethylformamide, N-methylpyrrolidone or bases such as pyridine. It is preferable to work in the presence of hydrogen ion acceptors, as for example ammonium carbonate or ammonium acetate, acetic ester or other readily saponifiable esters, as for example dialkyl carbonates, or amides, such as urea or dimethylformamide. For example, if the acid chloride or an ester of 1-amino-4-nitroanthraquinone-2-carboxylic acid or -sulfonic acid is used, the reaction is preferably carried out in alcoholic solution.

The reaction proceeds at a temperature between 20° and 180° C., but in general temperatures between 60° and 120° C. are used. The reaction period is in general 2 to 20 hours, preferably 5 to 10 hours. Longer reaction periods do not give any improvement in the yields. Shorter reaction periods are also possible, but then the yields are greatly decreased. The compounds obtainable according to this invention are isolated in a simple way by filtering them off from the liquid, if desired after previous neutralization with acids, and washing with water. The yields of the cyanide reaction are usually excellent. The products of the process are formed in high purity; if desired, they may be further purified by the usual methods.

The reaction of the compounds of the Formulae IIIa and IIIb with cyanides probably proceeds by a cyanide ion entering the 3-position of the anthraquinone nucleus by nucleophilic substitution and by the nitro group being reduced to the amino group during the course of the reaction. The cyanide is thus oxidized to cyanate which yields ammonia by hydrolysis. When using anthraquinone-2-sulfonic acids of the Formula IIIb, the sulfonic acid group is split off and cyanide radicals also enter into the 2-position of the anthraquinone nucleus, as also when using 1-amino-4-nitroanthraquinones. In all cases, compounds of the Formula II are formed by reduction of the nitro group and ring closure of a carbonamide group with the nitrile group.

The dyes of the present invention give clear and very fast dyeings on materials of polyacrylonitrile and especially on polyester materials, such as polyethylene glycol terephthalate or poly-4,4'-dimethylolcyclohexane terephthalate and polyacrylonitrile materials, such as sheets, films or textile materials, such as fibers, filaments, threads, flock, woven fabrics or knitted fabrics.

The invention is illustrated by, but not limited to, the following Examples in which parts are by weight.

*Example 1*

31.2 parts of 1-amino-4-nitroanthraquinone-2-carboxylic acid (commercial product) is finely ground with 10.3 parts of potassium carbonate and stirred into a slurry with 175 parts of water. Gentle heating is applied with stirring until evolution of carbon dioxide has ceased. Then 27 parts of potassium cyanide is stirred in and 18.5 parts of methanol added so that a reflux temperature of 90° to 95° C. is set up. The whole is stirred for about 8 to 10 hours at 90° to 95° C. After cooling, any cyanide still present is destroyed with sodium thiosulfate, the whole acidified slightly with dilute sulfuric acid, the finely crystalline precipitate filtered off by suction and washed with water until the liquid runs away colorless and has a neutral reaction. After drying, 26 parts of a deep blue powdery dye of the formula:

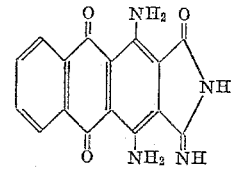

is obtained; it goes onto polyester fabric in clear turquoise blue shades of high fastness properties.

The same dye is obtained by replacing the potassium carbonate or the potassium cyanide or both by the corresponding sodium salt. Instead of methanol, other readily volatile inert solvents may be used, as for example ethanol or acetone. The addition is however not essential.

*Example 2*

7.9 parts of anhydrous sodium carbonate is dissolved in 175 parts of water and 31.2 parts of 1-amino-4-nitroanthraquinone-2-carboxylic acid slowly added at about 50 to 60° C. After evolution of carbon dioxide has ceased, 30 parts of urea, 20 parts of sodium cyanide and 20 parts of methanol are added and the whole is stirred under reflux at 90° to 95° C. for about 6 to 8 hours. The reaction is complete when the initially red crystals have been converted completely into small blue needles. This process can be easily followed under a microscope. By working up as described in Example 1, 26.5 parts of the dye described in Example 1 is obtained.

The urea may be replaced by carbamic acid or carbonic acid esters of monovalent alcohols. The addition is however not essential.

Instead of sodium cyanide, an equivalent amount of calcium cyanide may be used.

*Example 3*

412 parts of potassium carbonate is dissolved in 3000 parts of water and then 1248 parts of 1-amino-4-nitroanthraquinone-2-carboxylic acid is added at about 50° to 60° C. When evolution of carbon dioxide has ended, 1080 parts of potassium cyanide is stirred in and, when this has completely dissolved, 8000 parts of ethanol and 1480 parts of diethyl carbonate are added. The whole is stirred under reflux until upon microscopic examination only blue needles can be seen. The period required is about 12 to 24 hours. Then the alcohol is distilled off and the mixture worked up as in Example 1. 1100 parts of the dye described in Example 1 is obtained.

Instead of ethanol, other alcohols may be used or other inert solvents, for example methanol, glycol, glycol monomethyl ether, dimethylformamide, N-methylpyrrolidone, pyridine or dioxane.

Example 4

18 parts of 1-amino-4-nitroanthraquinone-2-carboxylic acid-β-hydroxyethylamide is suspended in 160 parts of ethyl alcohol and 25 parts of diethyl carbonate is added. The mixture is heated to reflux temperature and a solution of 14 parts of potassium cyanide in 28 parts of water is allowed to flow in while stirring in the course of about 5 hours. Then the whole is heated under reflux until initial material is no longer detectable in a sample under the microscope; this is usually the case after 6 to 8 hours. After cooling, the blue crystal mass is filtered off and washed well, first with methanol and then with water. After drying 15.5 parts of a dye of the formula:

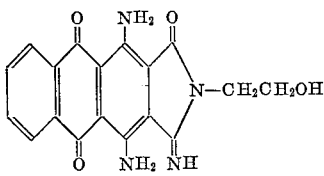

is obtained which crystallizes in needles and which dyes polyethylene terephthalate clear turquoise blue shades of high fastness properties and great color strength.

The above-mentioned amide may be obtained for example by reaction of 1-amino-4-nitroanthraquinone-2-carboxylic acid chloride with ethanolamine. If other amines, such as isopropanolamine, γ-methoxypropylamine or n-butylamine, are used instead of ethanolamine, the above-described reaction with cyanide gives 2-(2-hydroxypropyl)-, 2 - (3 - methoxypropyl)- and 2-butyl-1-oxo-3-imino - 4,7 - diamino - 5,6 - phthaloyl-dihydro-iso indole. These compounds are blue dyes with similar properties.

The two operations may also be comprised in a one-vessel process.

Example 5

33.1 parts of 1-amino-4-nitroanthraquinone-2-carboxylic acid chloride is suspended in 240 parts of ethanol and 35 parts of N-(γ-aminopropyl)-pyrrolidine is slowly added so that the temperature does not rise above 40° to 45° C. The whole is further stirred at 40° to 45° C. until a sample washed with alcohol and water is free from chlorine. Then 50 parts of diethyl carbonate is added and, at reflux temperature, a solution of 28 parts of potassium cyanide in 55 parts of water is allowed to flow in in the course of about 5 hours and the whole heated under reflux until the original red compound is completely converted into blue crystal needles. This usually requires 5 to 10 hours. After working up as in Example 4, 32 parts of a dye of the formula:

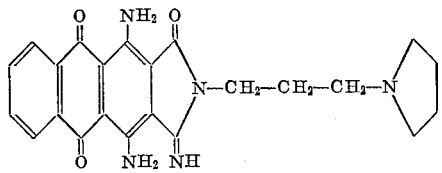

is obtained which crystallizes in long needles and dyes polyacrylonitrile full and clear blue shades of high all-round fastness.

By using 22 parts of β-aminopropionitrile instead of N-(γ-aminopropyl)-pyrrolidine, 32.5 parts of the dye of the formula:

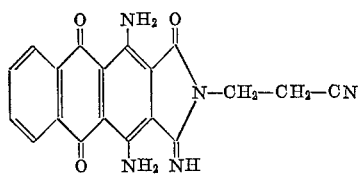

is obtained as black-blue needles by the same process.

Example 6

33.1 parts of 1-amino-4-nitroanthraquinone-2-carboxylic acid chloride is suspended in 240 parts of methanol and then 20 parts of 3-methoxypropylamine is added at 35° to 40° C. in the course of an hour. The whole is stirred for about 1 to 2 hours at 45° to 55° C. until a sample is free from chlorine. Then 35 parts of glycol monoacetate and 14.1 parts of powdered sodium cyanide and 9.3 parts of powdered potassium cyanide are added, the whole is heated to boiling and 56 parts of water allowed to flow in in the course of about 5 hours. Then the mixture is heated while stirring at the boiling point until a sample viewed under the microscope contains only long blue needles. This is the case after about 10 hours. Excess cyanide is then destroyed by adding 38 parts of crystallized sodium thiosulfate dissolved in 21 parts of water. The methanol is then distilled off, the whole diluted with about 250 parts of water, filtered by suction, washed thoroughly with hot water and with methanol until the liquid runs away clear blue. After drying, 33 parts of a dye of the formula:

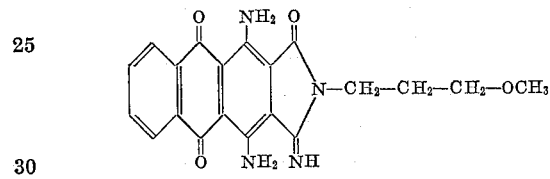

is obtained which crystallizes in deep blue needles, melts at 184° to 186° C. and contains 14.1% of nitrogen. It yields turquoise blue dyeings with excellent fastness on polyesters.

The following dyes of the formula:

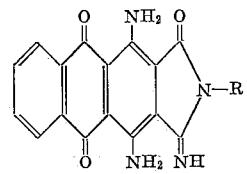

in which R has the meanings given in the following table are obtained in the same way:

| R = | Percent N by analysis | Melting point |
|---|---|---|
| —CH₂—CH₂—OH | 15.57 | 200° C. (decomposition). |
| —CH₂—CH₂—CH₂—OCH₃ | 14.1 | 184° to 186° C. |
| —CH₂—CH₂—CH₂—N⟨pyrrolidine⟩ | 15.9 | 183° to 184° C. |
| —CH₂—CH₂—CN | 18.2 | 280° C. (decomposition). |
| —CH₂—CH₂—N⟨morpholine⟩ | 16.5 | 262° to 263° C. |
| —CH₂—CH₂—CH₂—CH₃ | 14.2 | 215° to 220° C. |
| —CH₂—CH(OH)—CH₃ | 15.1 | 242° to 245° C. |
| —CH₂—CH₂—CH₂—OH | 14.0 | 240° to 243° C. |
| —CH₂—CH₂—CH₂—N⟨piperazine-H⟩ | 15.6 | 188° to 190° C. |
| —CH₂—CH₂—CH₂—OC₂H₅ | 12.3 | 150° C. |
| —CH₂—CH₂—OCH₂—CH₂—OH | 13.1 | 206° to 208° C. |
| —CH₂—CH₂—CH₂—N⟨piperazine-CH₃, H⟩ | 14.9 | 157° to 159° C. |

Example 7

32.4 parts of 1-amino-4-nitroanthraquinone-2-carboxylic acid is suspended in 240 parts of methanol and the mixture, after adding 35 parts of glycol monoacetate, 19.8 parts of 3-methoxypropylamine, 7.4 parts of potassium cyanide and 13.2 parts of sodium cyanide, heated to boiling. While stirring, 56 parts of water is allowed to flow in in the course of about 5 hours and the whole then stirred at boiling temperature until initial material can no longer be detected microscopically in a sample. The solvent is then distilled off, the finely crystalline precipitate filtered off by suction and washed with water until the liquid runs away colorless. After drying, 12.4 parts of a dye of the probable formula:

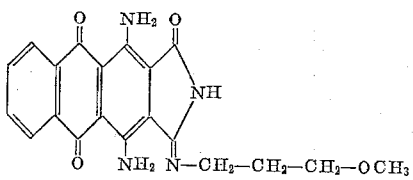

is obtained as a dark blue powder which has a nitrogen content of 17.7% and a melting point of 235° C. (decomposition). It dyes polyester fibers clear turquoise blue shades of good fastness properties.

Example 8

10 parts of the dye obtained in Example 1 are dissolved in 100 parts of 96% sulfuric acid and stirred for two hours at 120° to 130° C. After cooling, the mixture is poured onto a mixture of ice and water and the suspension then heated to 90° to 95° C. and further stirred for about half to three-quarters of an hour at this temperature. The product is filtered off by suction while still warm, washed neutral with water and after drying, 9.8 parts of 1,4-diaminoanthraquinone-2,3-dicarboxylic acid imide is obtained which melts above 300° C. and has a nitrogen content of 13.8%.

The same result is arrived at by treating the dyes obtained in Example 6 in the manner described above.

Example 9

10 parts of the dye obtained according to the first paragraph of Example 6 is dissolved in and precipitated from 100 parts of 96% sulfuric acid and the moist filter residue is suspended in 250 parts of concentrated hydrochloric acid. The slurry is heated to 80° to 90° C. within about two hours and further stirred for another two hours at this temperature. The mixture is then poured into water while stirring, the suspension heated to 80° to 90° C. and stirred for about half an hour at this temperature. The whole is filtered by suction while still warm and the precipitate is washed neutral with water and dried. 9.9 parts of 1,4-diaminoanthraquinone-2,3-dicarboxylic acid-N-γ-methoxypropylimide is obtained which gives much more greenish dyeings on polyester fibers and has a nitrogen value of 11.45%.

The partial saponification can be carried out with sulfuric acid instead of with hydrochloric acid.

By using the compounds set out in the table in Example 6, the corresponding 1,4-diaminoanthraquinone-2,3-dicarboxylic acid imides are obtained.

Example 10

10 parts of the dye obtained according to Example 6 is dissolved in a melt of 100 parts of aluminum chloride and 25 parts of urea at 25° to 30° C. and 10 parts of bromine is dripped in in the course of about an hour. Then the temperature is slowly raised to 40° to 45° C. and the whole stirred for another five hours at this temperature. The mixture is then poured onto a mixture of ice and water, the suspension is acidified with hydrochloric acid and the precipitate filtered off by suction and washed neutral. 12.6 parts of a dye of the formula:

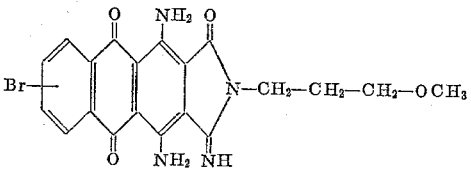

is obtained as a dark blue powder which melts at 115° to 130° C. and contains 18.5% of bromine.

By carrying out halogenation by leading in chorine under otherwise identical conditions, a dye of the formula:

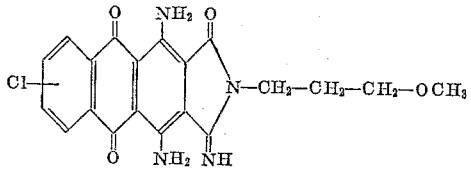

is obtained which contains 12.7% of chlorine, melts at 130° to 145° C. and dyes polyester fibers more greenish turquoise shades than the initial product.

Example 11

26.8 parts of finely powdered 1-amino-4-nitroanthraquinone is dissolved in 250 parts of dimethylformamide by heating. A solution of 27 parts of potassium cyanide in 55 parts of water is then stirred in at about 95° to 98° C. in the course of about five hours. The whole is further stirred at 95° to 98° C. until the brown-violet initial material has been completely converted into the deep blue end product. Then the whole is heated for a short time to boiling, the precipitate filtered off by suction while hot, washed several times with hot dimethylformamide and then 200 parts of methanol stirred into the filtrate. The mixture is allowed to stand for about 24 hours at room temperature, the product then filtered off by suction, and washed well with methanol and then with water. After drying, 20 parts of deep blue powdered dye is obtained which is identical with the dye of Example 1.

Example 12

37 parts of 1-amino-4-nitroanthraquinone-2-sulfonic acid sodium salt (prepared from 1-aminoanthraquinone-2-sulfonic acid by nitration while protecting the amino group) is dissolved in 175 parts of hot water and 18.5 parts of methanol is added so that upon heating a boiling temperature of about 90° to 95° C. is set up. Then, with stirring and refluxing, a solution of 27 parts of potassium cyanide in 55 arts of water is slowly added within five hours. Then the whole is stirred under reflux until the red initial material has been completely converted into a blue powder. Then carbon dioxide is supplied to the suspension until no further hydrogen cyanide escapes. After cooling, the product is filtered off and washed well with water. After drying, 22 parts of a deep blue powdered dye is obtained which is identical with the dye of Example 1.

We claim:

1. A dye of the formula:

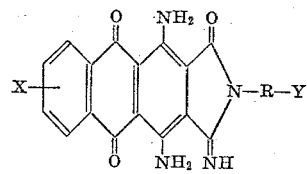

in which
X denotes an atom selected from the class consisting of hydrogen, chlorine and bromine,
R denotes a divalent alkylene group selected from the class consisting of ethylene, propylene and butylene, Y denotes a group selected from the class consisting of hydrogen, hydroxy, methoxy, ethoxy, hydroxyethoxy, cyano, pyrrolidino, pyrrolidono, piperidino and methylcyclohexylamino.

2. The dye of the formula:

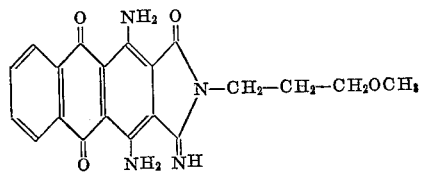

3. The dye of the formula:

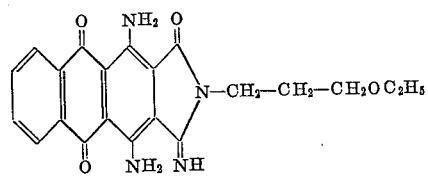

4. The dye of the formula:

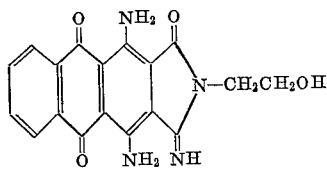

5. The dye of the formula:

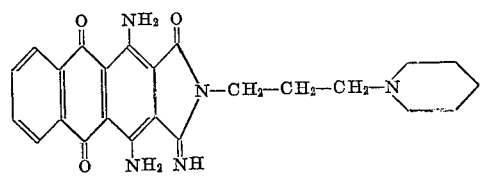

6. The dye of the formula:

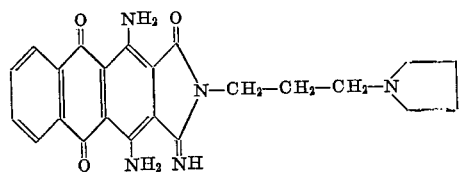

7. A process for the production of a compound of the formula

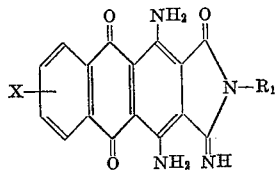

wherein X denotes a substituent selected from the class consisting of hydrogen, chlorine and bromine, and $R_1$ denotes a radical selected from the class consisting of hydrogen, alkyl, hydroxyalkyl, methoxyalkyl, ethoxyalkyl, cyanoalkyl, pyrrolidinoalkyl, pyrrolidonoalkyl, piperidinoalkyl and methylcyclohexylamino alkyl, said alkyl radicals containing 1 to 10 carbon atoms, which process comprises: heating a compound of the formula

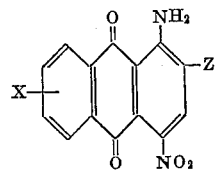

wherein X has the above meaning and Z denotes a radical selected from the class consisting of hydrogen, carboxy, the carboxylic acid amide group of the formula

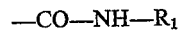

—CO—NH—$R_1$ in which $R_1$ has the above meaning, carboxylic acid halide, carboxylic acid ester and sulfonic acid, with a water-soluble ionic cyanide selected from the class consisting of sodium cyanide, potassium cyanide, magnesium cyanide and calcium cyanide in a polar diluent at 20° C. to 180° C.

References Cited in the file of this patent

UNITED STATES PATENTS

| | | |
|---|---|---|
| 2,628,963 | Laucius et al. | Feb. 17, 1953 |
| 2,701,802 | Boyd | Feb. 8, 1955 |
| 2,753,356 | Laucius et al. | July 3, 1956 |

FOREIGN PATENTS

| | | |
|---|---|---|
| 773,212 | Great Britain | Apr. 24, 1957 |
| 1,073,661 | Germany | Jan. 21, 1960 |

OTHER REFERENCES

Kundiger et al.: Chem. Abs., vol. 48, col. 4430-31 (1954).